June 26, 1928.
K. BERGER
CLUTCH MECHANISM
Filed Jan. 24, 1927
1,675,086
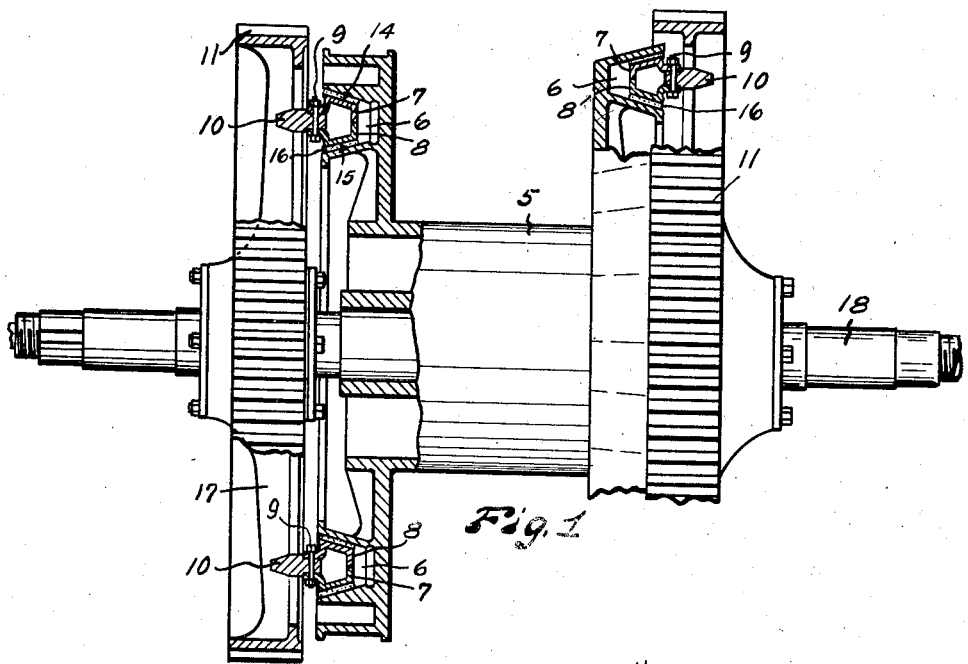
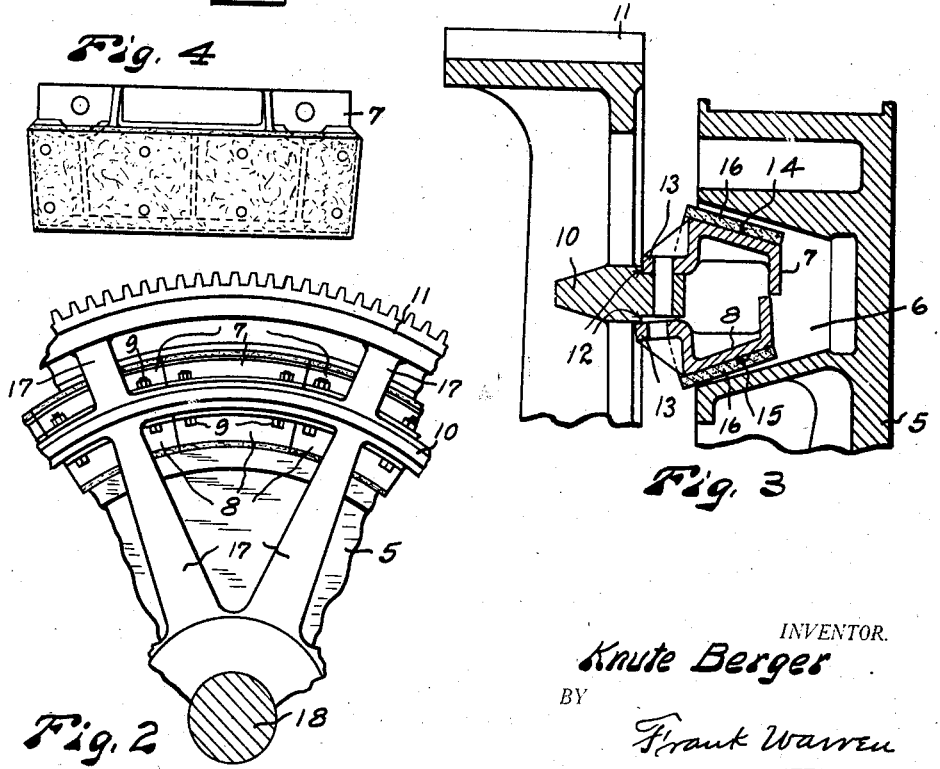
INVENTOR.
Knute Berger
BY
Frank Warren
ATTORNEY.

Patented June 26, 1928.

1,675,086

UNITED STATES PATENT OFFICE.

KNUTE BERGER, OF SEATTLE, WASHINGTON.

CLUTCH MECHANISM.

Application filed January 24, 1927. Serial No. 163,020.

My invention relates to improvements in clutch mechanism of the cone clutch type and the object of my invention is to provide a cone clutch in which the cone is built up of two part sections and the cone parts are removable individually without dis-assembling any of the other parts of the clutch.

A further object is to provide a clutch in which the built up clutch cone is on a spoked wheel and the cone sections are removable between the spokes of the wheel, and, in which the normal clearance of the clutch, when released, is sufficient to permit removal of the sections.

The clutch is hereinafter shown and described as applied to a winding drum that is used for handling heavy loads, the clutch receptacle being formed in the end of the drum and the clutch cone being built up on the side of a gearwheel that is disposed adjacent the end of the drum. It will be understood that the invention may be embodied in numerous other types of clutches.

Other and more specific objects will be apparent from the following description taken in connection with the accompanying drawings.

In the drawings, Figure 1 is a view partly in section and partly in elevation showing my sectional clutch applied to a winding drum.

Fig. 2 is a fragmentary end view of the same, parts being shown in section.

Fig. 3 is a fragmentary sectional view on a larger scale of my clutch showing the two parts of a section of said clutch unbolted and one of said parts in a position it may assume when it is being inserted or removed.

Fig. 4 is a detached plan view of one of the clutch sections.

Referring to the drawings, throughout which like reference numerals designate like parts, 5 designates a winding drum provided on one or both ends with an annular conical clutch receptacle 6 for the reception of my sectional clutch cone.

The clutch cone proper is formed of a plurality of outer sections 7 and a plurality of inner sections 8. These sections 7 and 8 are relatively short as shown in Fig. 4 and are adapted to be secured, as by bolts 9, to a continuous supporting ring 10 that is preferably cast integrally with a gearwheel 11. The ring 10 is provided with annular shoulders 12 against which the respective base portions 13 of the clutch sections may abut to form a thrust bearing for said sections. The shoulders 12 are shallow enough so that the base portions of the clutch sections will clear said shoulders, see Fig. 3, and pass over the same when the sections are being inserted or removed. The outer sections 7 each have convex, preferably roughened surfaces 14 shaped to conform to the adjacent surface of the receptacle 6 while the inner sections 8 each have concave surfaces 15, preferably roughened and also shaped to conform to the adjacent surface of the receptacle 6. The surfaces 14 and 15 preferably both have friction material as brake lining 16 secured thereto, the friction material on each section being separable from that on the other sections.

The gearwheels 11 may have spokes 17 that are arranged far enough apart so that the outer and inner clutch sections 7 and 8 may be readily removed through the openings between said spokes.

The ring 10 and the clutch sections 7 and 8 secured thereto by bolts 9 form a cone structure sufficiently flexible to permit any slight automatic adjustment that may be necessary to correctly position the clutch member within the receptacle 6.

The outer and inner clutch members 7 and 8 are preferably arranged in pairs and the ends of said members are free and unattached relative to the ends of adjacent members so that each pair of clutch members constitutes a section that is free to flex slightly relative to the other sections.

In the drawings I have shown a clutch at each end of the drum 5 and have shown a gear wheel 11 at each end of said drum, the gear wheels being the driving members and being mounted on the same shaft 18 as the drum. Obviously in some cases only one clutch will be used. When the shaft 18 is mounted in bearings and carefully aligned it becomes difficult and requires a considerable amount of labor to demount said shaft and remove or withdraw the gearwheels 11 far enough so that the lining could be renewed on a solid or non-sectional clutch cone. When the cone is constructed of the sections 7 and 8 in accordance with my present invention it is possible to take out the bolts 9 and remove, reline and replace the sections 7 and 8 without disturbing the assembly of any of the mechanism that is associated therewith. This is made possible by making the inner sections separable from the outer sections and by making all of said sections short enough so they may be removed through the gearwheels 11 and by making the shoulders 12 shallow so that the normal clearance of the lined portions of the clutch sections, when released, will permit the base portions 13 of the clutch sections to clear said shoulders 12.

The foregoing description and accompanying drawings clearly disclose a preferred embodiment of my invention but it will be understood that this disclosure is merely illustrative and that such changes in the invention may be made as are within the scope and spirit of the following claims.

What I claim is:—

1. In a clutch of the class described, a drum having an annular clutch receptacle of convergent cross sectional shape on the end thereof, a gearwheel rotatably mounted at one end of said drum, an annular supporting ring rigid with said gearwheel inwardly from the peripheral portion thereof, said gearwheel having spokes that leave openings both inside and outside of said supporting ring and said supporting ring having relatively shallow shoulders formed thereon, outer clutch sections removably bolted to said supporting ring and constituting an outer annular cone member and inner clutch sections removably bolted to said supporting ring and constituting an inner annular cone member all of said sections being removable through the openings between the spokes of said gearwheel.

2. In a clutch of the class described, a drum having an annular clutch receptacle of convergent cross-sectional shape on the end thereof, a gearwheel rotatably mounted at one end of said drum, an annular supporting ring rigid with said gearwheel inwardly from the peripheral portion thereof, said gearwheel having spokes that leave openings both inside and outside of said supporting ring and said supporting ring having shallow shoulders formed thereon, outer clutch sections removably bolted to said supporting ring and constituting an outer annular cone member and inner clutch sections removably bolted to said supporting ring and constituting an inner annular cone member all of said sections being removable through openings between the spokes of said gearwheel, said clutch when released permitting the clutch sections to be tilted enough to clear said shoulders when said sections are inserted and removed.

In witness whereof, I hereunto subscribe my name this 11th day of January, A. D. 1927.

KNUTE BERGER.